INVENTOR
George R. Purifoy.

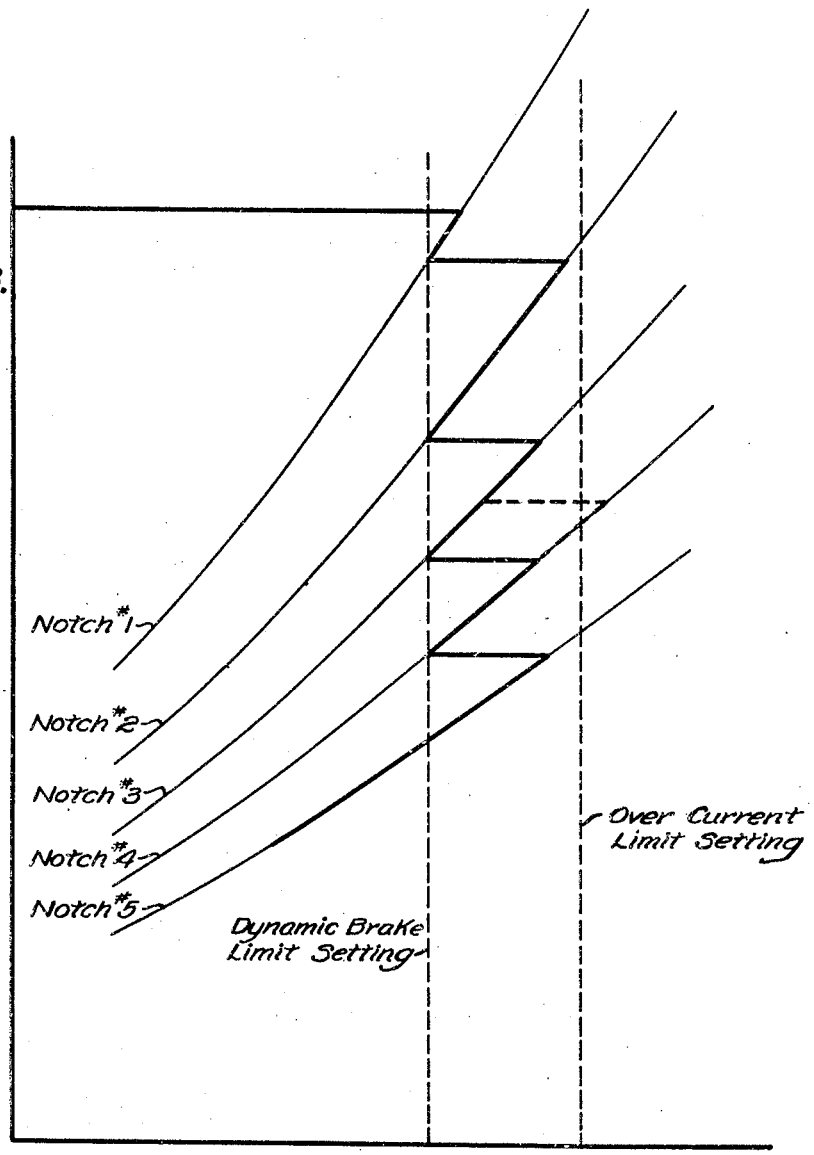

Patented Feb. 29, 1944

2,342,754

UNITED STATES PATENT OFFICE 2,342,754

CONTROL SYSTEM

George R. Purifoy, Pittsburgh, Pa., assignor to Westinghouse Electric & Manufacturing Company, East Pittsburgh, Pa., a corporation of Pennsylvania Application October 30, 1942, Serial No. 463,980

10 Claims. (Cl. 172—179)

My invention relates, generally, to control systems and, more particularly, to systems for controlling the operation of the propelling motors of electric vehicles.

When operating electric locomotives over steep grades and hauling heavy loads it is desirable to provide some means for preventing the motors from generating an excessive current during dynamic braking. Otherwise, there is danger of overheating the motors and also developing sufficient tractive effort to cause wheel slippage during the braking operation.

An object of my invention is to prevent an excessive current from flowing through the windings of electric motors during dynamic braking.

Another object of my invention is to provide automatic progression and retrogression of the control apparatus for controlling electric motors during dynamic braking.

A further object of my invention is to provide for both manual and automatic control of the dynamic braking of electric vehicles.

Other objects of my invention will be explained fully hereinafter or will be apparent to those skilled in the art.

In accordance with my invention, the automatic progression of the dynamic braking control apparatus for an electric vehicle is controlled by a limit relay in the usual manner. However, if the speed of the vehicle increases to such an extent that the motor current is above the setting of an overcurrent limit relay, the control retrogresses until the proper current value is obtained. The automatic progression can be held at any desired point by means of a controller, provided the current does not exceed the setting of the overcurrent relay. In this manner a desired current can be maintained while descending a grade. If additional braking is required, the dynamic brake may be supplemented by air brakes of the usual type.

For a fuller understanding of the nature and objects of my invention, reference may be had to the following detailed description, taken in conjunction with the accompanying drawings, in which:

Fig. 3 is a typical dynamic brake notching curve for a motor of the type utilized for propelling electric locomotives.

Figures 1, 2:
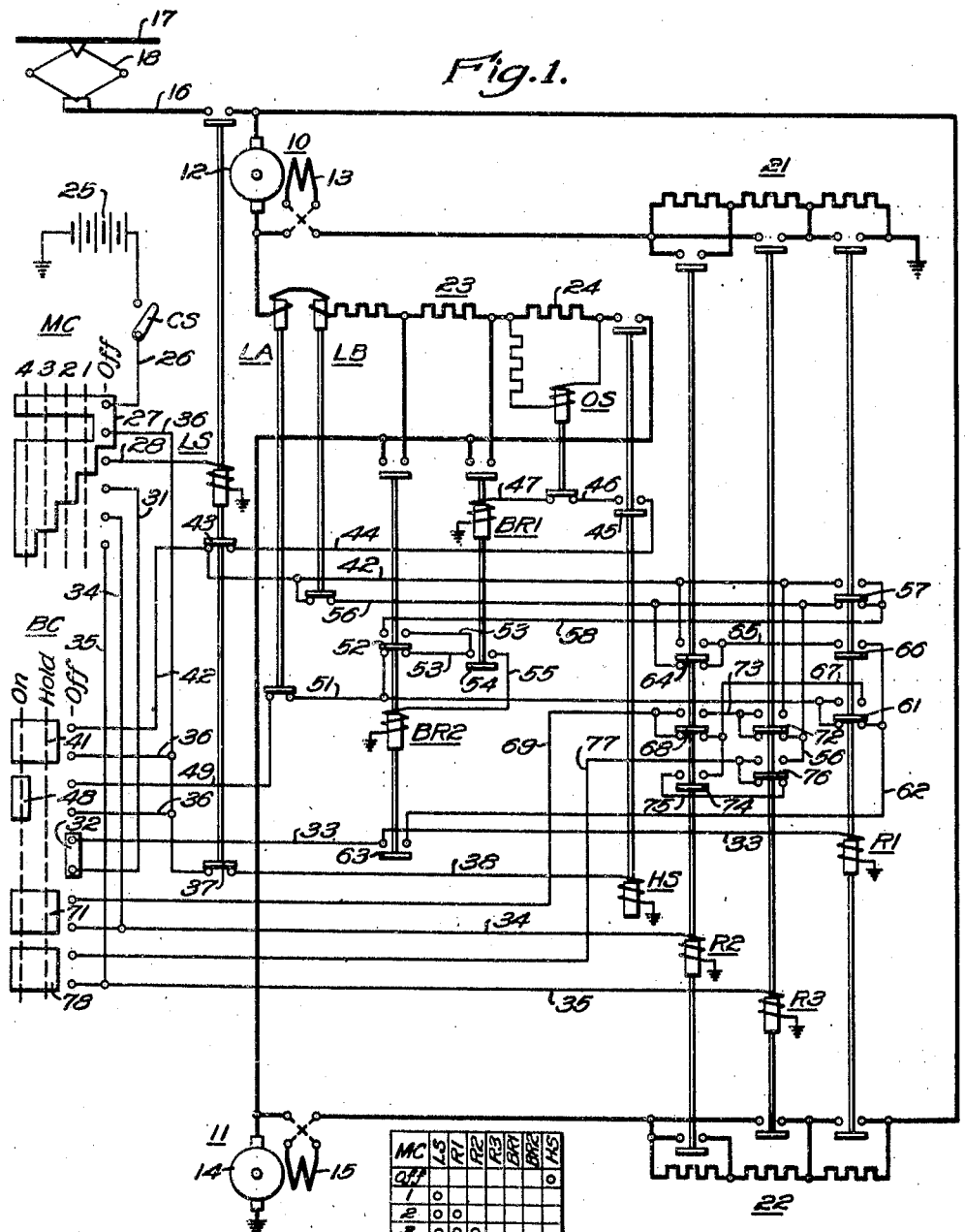
Figure 1 is a diagrammatic view of a control system embodying my invention.
Fig. 2 is a chart, showing the sequence of operation of part of the apparatus illustrated in Fig. 1.

Referring to the drawings, the system disclosed therein comprises a pair of motors 10 and 11 which may be of a type suitable for propelling an electric locomotive. The motor 10 is provided with an armature winding 12 and a series field winding 13. Likewise, the motor 11 is provided with an armature winding 14 and a series field winding 15. The power for operating the motors may be supplied through a power conductor 16 which is connected to a trolley conductor 17 through a pantograph current collector 18. A line switch LS is provided for connecting the motors 10 and 11 to the power conductor 16.

In accordance with usual practice, the motors 10 and 11 may be connected in parallel-circuit relation during acceleration of the locomotive. Current-limiting resistors 21 and 22 of the usual type may be utilized for controlling the motor current during acceleration. Resistor-shunting switches R1, R2 and R3, having contact members disposed to shunt portions of the resistors 21 and 22 from the motor circuit, are operable in sequential relation to shunt the resistors in a step-by-step manner. During acceleration of the locomotive, the operation of the resistor-shunting switches R1, R2 and R3 is controlled by a master controller MC in the usual manner.

Provision is made for dynamically braking the locomotive by means of the motors 10 and 11. In accordance with the usual practice, the dynamic braking connections are such that the field winding 15 of the motor 11 is connected across the armature winding 12 of the motor 10, and the field winding 13 of the motor 10 is connected across the armature winding 14 of the motor 11, thereby causing the motors to function as generators and circulate a current through a resistor 23, as well as through the resistors 21 and 22 during dynamic braking.

As fully described in the copending application of L. G. Riley, Serial No. 463,982, filed October 30, 1942, the contact members of a switch HS are closed when the master controller MC is actuated to the "off" position, thereby establishing the dynamic braking connections for the motors, and permitting a relatively small current to circulate through the motors during coasting of the locomotive. However, in view of the fact that the total resistance in the motor circuit during coasting is relatively high, the circulating current is not sufficient to produce any appreciable braking effect.

As described and claimed in the foregoing application, the actuating coil of a relay OS is connected across a portion 24 of the resistor 23, and is, therefore, responsive to the circulating current during coasting, which, in turn, is proportional to the speed of the locomotive. The contact members of the relay OS are so connected in the control circuits that the progression of the control apparatus to provide the full dynamic braking effect cannot take place so long as the speed of the locomotive is such that it would be injurious to the equipment to permit the dynamic braking action to take effect. Therefore, it is necessary to reduce the speed of the locomotive by means of the usual air brake equipment to a point at which the relay OS will permit the dynamic braking action to take place.

In order to prevent the dynamic braking current from exceeding the safe limit for the machines during dynamic braking, a pair of current limit relays LA and LB may be utilized to control the operation of switches BR1 and BR2, which are disposed to shunt portions of the resistor 23 from the dynamic braking circuit, and also the operation of the resistor-shunting switches R1, R2 and R3 which shunt the resistors 21 and 22 during dynamic braking. The relay LA controls the automatic progression of the foregoing resistor-shunting switches in the usual manner. The relay LB cooperates with interlock members provided on the resistor-shunting switches to control the retrogression of these switches to reinsert the control resistors in the motor circuit step-by-step to prevent an excessive current from flowing through the motors in the event that the speed of the locomotive increases during dynamic braking.

The retrogressive operation of the resistor-shunting switches may be more clearly understood by referring to the curve in Fig. 3, which is a typical dynamic brake notching curve for a motor of the type utilized in the present system. Let it be assumed that the control has progressed to the fourth notch under the control of the limit relay LA which, for example, may be set to operate at 650 amperes, since the current of two motors is flowing through the limit relays, and that the locomotive speed increase sufficiently to cause the braking current to exceed 900 amperes, which is the setting of the limit relay LB. When the current reaches this value, the relay LB operates to open its contact members, thereby causing the switch R2 to open and reinsert into the motor circuit the resistance previously shunted by the switch, which should reduce the dynamic braking current, as indicated by the dotted portion of the curve. If the speed is still so high that the current exceeds the setting of the relay LB, the control will retrogress another notch in the same manner to insert still more resistance in the motor circuit. In this manner the control retrogresses until the proper current value is obtained, thereby preventing an excessive current from flowing through the machines during dynamic braking. If additional braking effect is required to control the speed of the locomotive, the dynamic brake may be supplemented by the air brakes in the usual manner.

A braking controller BC is provided for initiating the automatic progression of the resistor-shunting switches during dynamic braking. The controller BC is so constructed that the progression of the dynamic braking control apparatus can be held at any desired point provided the current does not exceed a predetermined amount while the progression is being held on that point. As explained hereinbefore, if the current becomes excessive, the automatic retrogression of the apparatus takes place regardless of the position of the braking controller, thereby making it impossible for the operator of the vehicle to permit a current value to be maintained which would be injurious to the machines. The controllers MC and BC are electrically interlocked in the usual manner to prevent improper operation of the equipment.

In order that the functioning of the foregoing apparatus may be more clearly understood, the operation of the system will now be described in more detail. Assuming that a control switch CS has been closed, the switch LS may be closed to connect the motors 10 and 11 to the power conductor 16 by actuating the controller MC to position 1. When the controller MC is in position 1, the actuating coil of the switch LS is energized through a circuit which may be traced from a battery 25 through the switch CS, conductor 26, a contact segment 27 of the controller MC, conductor 28, and the actuating coil of the switch LS to ground. The closing of the switch LS connects the motors 10 and 11 across the power source in parallel-circuit relation, the motor 10 being connected in series-circuit relation with the resistor 21, and the motor 11 being connected in series-circuit relation with the resistor 22.

The motors may be accelerated in the usual manner by actuating the controller MC through positions 2, 3 and 4, thereby closing the switches R1, R2 and R3 in sequential relation to shunt the resistors 21 and 22 from the motor circuit in a step-by-step manner. When the controller MC is on position 2, the actuating coil of the switch R1 is energized through a circuit which extends from the controller MC through conductor 31, a contact segment 32 on the controller BC, conductor 33 and the actuating coil of the switch R1 to ground. When the controller MC is on position 3, the switch R2 is energized through a circuit which extends from the controller MC through conductor 34 and the actuating coil of the switch R2 to ground. When the controller MC is on position 4, the switch R3 is energized through a circuit which extends from controller MC through conductor 35 and the actuating coil of the switch R3 to ground.

If it is desired to retard the movement of the locomotive by dynamic braking, the controller MC must be actuated to the "off" position, thereby opening the switch LS to disconnect the motors from the power source and also opening the switches R1, R2 and R3. When the controller MC is in the "off" position, the switch HS is closed to establish the dynamic braking connections for the motors. The energizing circuit for the actuating coil of the switch HS may be traced from the controller MC through conductor 36, an interlock 37 on the switch LS, conductor 38, and the actuating coil of the switch HS to ground.

As explained hereinbefore, all of the resistors 21, 22 and 23 are connected in the motor circuit by the closing of the switch HS. Therefore, a relatively small amount of current is permitted to circulate through the motors while the locomotive is coasting. If the circulating current is below the setting of the relay OS, the actuating coil of which is connected across the portion 24 of the resistor 23, the contact members of the relay OS remain closed, thereby permitting the operation of the switch BR1 to initiate the dynamic braking progression upon the operation of the controller BC. However, if the speed of the vehicle is high enough to cause sufficient circulating current to operate the relay OS, thereby opening its contact members, the switch BR1 cannot be closed to initiate the dynamic braking progression.

Assuming that the contact members of the relay OS remain closed, the switch BR1 may be closed by actuating the controller BC to the "hold" position. The energizing circuit for the actuating coil of the switch BR1 may be traced from the controller MC through conductor 36, a contact segment 41 on the controller BC, conductor 42, an interlock 43 on the switch LS, conductor 44, an interlock 45 on the switch HS, conductor 46, the contact members of the relay OS, conductor 47, and the actuating coil of the switch BR1 to ground. The closing of the switch BR1 shunts the resistor section 24 from the dynamic braking circuit, thereby permitting the current to increase, which increases the dynamic braking effect.

The switches BR2, R1, R2 and R3 may be closed in sequential relation by actuating the controller BC to the "on" position. The progression of these switches is automatically controlled by the current limit relay LA. The sequential operation is governed by interlocking members on the switches in the usual manner. Thus, when the controller BC is actuated to the "on" position, an energizing circuit for the switch BR2 is established which may be traced from the conductor 36, through a contact segment 48 on the controller BC, conductor 49, the contact members of the relay LA, conductor 51, an interlock 52 on the switch BR2, conductor 53, an interlock 54 on the switch BR1, conductor 55, and the actuating coil of the switch BR2 to ground. Upon the closing of the switch BR2, a holding circuit for that switch is established which may be traced from the conductor 42 through the contact members of the relay LB, conductor 56, an interlock 57 on the switch R1, conductor 58, the interlock 52 on the switch BR2, which is now in its uppermost position, conductor 53, the interlock 54 on the switch BR1, and conductor 55 to the actuating coil of the switch BR2.

Following the closing of the switch BR2, the switch R1 is closed. The energizing circuit for the switch R1 may be traced from the conductor 49 through the contact members of the relay LA, conductor 51, an interlock 61 on the switch R1, conductor 62, an interlock 63 on the switch BR2, conductor 33 and the actuating coil of the switch R1 to ground. Upon the closing of the switch R1, a holding circuit is established for that switch which may be traced from the conductor 42 through the contact members of the relay LB, conductor 56, an interlock 64 on the switch R2, conductor 65, an interlock 66 on the switch R1, conductor 62, and thence to the actuating coil of the switch R1 through a circuit previously traced.

Following the closing of the switch R1, the switch R2 is closed. The energizing circuit for the switch R2 may be traced from the conductor 49 through the contact members of the relay LA, conductor 51, the interlock 61, on the switch R1, which is now in its uppermost position, conductor 67, interlock 68 on the switch R2, conductor 69, contact segment 71 on the switch BC, conductor 34 and the actuating coil of the switch R2 to ground. Upon the closing of the switch R2 a holding circuit for that switch is established from the conductor 42 through the contact members of the relay LB, conductor 56, an interlock 72 on the switch R3, conductor 73 and the interlock 68 on the switch R2, which is now in its uppermost position, conductor 69, and thence to the actuating coil of the switch R2 through a circuit previously traced.

Following the closing of the switch R2, the switch R3 is closed. The energizing circuit for the switch R3 extends from the previously energized conductor 67 through an interlock 74 on the switch R2, conductor 75, an interlock 76 on the switch R3, conductor 77, a contact segment 78 on the controller BC, conductor 35 and the actuating coil of the switch R3 to ground. Upon the closing of the switch R3, a holding circuit is established which may be traced from the conductor 42, through the contact members of the relay LB, conductor 56, the interlock 76 which is now in its uppermost position, conductor 77, and thence to the actuating coil of the switch R3 through the circuit previously traced.

As explained hereinbefore, the automatic progression of the resistor shunting switches may be stopped at any time by actuating the controller BC to the "hold" position, thereby holding the progression at any desired point provided the dynamic braking current is not sufficient to operate the relay LB. If at any time during the dynamic braking progression the relay LB is operated to open its contact members, the progression of the control is stopped and retrogression is started by the opening of the last switch to be closed during the progression. Thus, assuming that upon the closing of the switch R2 the dynamic braking current exceeds the setting of the limit relay LB, the switch R2 is reopened by the interruption of the holding circuit for the actuating coil of this switch which extends through the contact members of the relay LB. In this manner the switch R2 is opened to reinsert the portions of the current-limiting resistors previously shunted by this switch, thereby causing the motors to operate on the dotted portion of the curve shown in Fig. 3.

If the current still exceeds the setting of the relay LB, the switch R1 is opened by the interruption of the holding circuit for this switch which is controlled by the relay LB. In this manner the control will retrogress until the proper current value is obtained. Furthermore, the retrogression takes place independently of the position of the controller BC.

From the foregoing description it is evident that I have devised a control system which provides overcurrent protection for electric motors during dynamic braking of the motors. The present system is particularly suitable for use on electric locomotives and other vehicles, since the functioning of the equipment is such that relatively smooth operation of the vehicle is obtained during both acceleration and dynamic braking, as the control apparatus progresses and retrogresses in a step-by-step manner. The present equipment functions not only to prevent excessive current from flowing through the motors, but also to prevent slipping of the wheels of a locomotive by preventing an excessive tractive effort during dynamic braking.

Since many modifications may be made in the apparatus and arrangement of parts without departing from the spirit and scope of my invention, I do not wish to be limited other than by the scope of the appended claims.

I claim as my invention:

1. In a control system, in combination, a motor, means for establishing a dynamic braking circuit for the motor to control the motor speed, control means operable either progressively or retrogressively to control the motor current during dynamic braking, and a plurality of relays responsive to the motor current for jointly controlling the operation of said control means to maintain a predetermined current in the motor circuit during dynamic braking.

2. In a control system, in combination, a motor, means for establishing a dynamic braking circuit for the motor to control the motor speed, control means operable either progressively or retrogressively to control the motor current during dynamic braking, and a pair of relays responsive to the motor current for controlling the operation of said control means, one of said relays controlling the progressive operation of the control means and the other of said relays controlling the retrogressive operation of said control means to maintain a predetermined current in the motor circuit during dynamic braking.

3. In a control system, in combination, a motor, means for establishing a dynamic braking circuit for the motor to control the motor speed, control means operable either progressively or retrogressively to control the motor current during dynamic braking, relay means responsive to the motor current for so controlling the operation of said control means as to maintain a predetermined current in the motor circuit during dynamic braking, and a manually operable controller cooperating with said relay means in the control of said control means.

4. In a control system, in combination, a motor, means for establishing a dynamic braking circuit for the motor to control the motor speed, resistance means connected in the dynamic braking circuit for controlling the motor current during dynamic braking, a plurality of resistor-shunting switches operable in sequential relation either progressively or retrogressively to vary the resistance in the dynamic braking circuit, and relay means responsive to the motor current for controlling the operation of said resistor-shunting switches to maintain a predetermined current in the motor circuit during dynamic braking.

5. In a control system, in combination, a motor, means for establishing a dynamic braking circuit for the motor to control the motor speed, resistance means connected in the dynamic braking circuit for controlling the motor current during dynamic braking, a plurality of resistor-shunting switches operable in sequential relation either progressively or retrogressively to vary the resistance in the dynamic braking circuit, relay means responsive to the motor current for controlling the operation of said resistor-shunting switches to maintain a predetermined current in the motor circuit during dynamic braking, and interlocking means actuated by said switches and cooperating with said relay means in controlling the operation of said switches.

6. In a control system, in combination, a motor, means for establishing a dynamic braking circuit for the motor to control the motor speed, resistance means connected in the dynamic braking circuit for controlling the motor current during dynamic braking, a plurality of resistor-shunting switches operable in sequential relation either progressively or retrogressively to vary the resistance in the dynamic braking circuit, and relay means responsive to the motor current for controlling the progressive and retrogressive operation of said resistor-shunting switches to maintain a predetermined current in the motor circuit during dynamic braking.

7. In a control system, in combination, a motor, means for establishing a dynamic braking circuit for the motor to control the motor speed, resistance means connected in the dynamic braking circuit for controlling the motor current during dynamic braking, a plurality of resistor-shunting switches operable in sequential relation either progressively or retrogressively to vary the resistance in the dynamic braking circuit, relay means responsive to the motor current for controlling the progressive and retrogressive operation of said resistor-shunting switches to maintain a predetermined current in the motor circuit during dynamic braking, and interlocking means actuated by said switches to control their sequential operation.

8. In a control system, in combination, a motor, means for establishing a dynamic braking circut for the motor to control the motor speed, resistance means connected in the dynamic braking circuit for controlling the motor current during dynamic braking, a plurality of resistor-shunting switches operable in sequential relation either progressively or retrogressively to vary the resistance in the dynamic braking circuit, relay means responsive to the motor current for controlling the progressive and retrogressive operation of said resistor-shunting switches to maintain a predetermined current in the motor circuit during dynamic braking, interlocking means actuated by said switches to control their sequential operation, and a manually operable controller cooperating with said relay means and said interlocking means in controlling the operation of said switches.

9. In a control system, in combination, a motor, means for establishing a dynamic braking circuit for the motor to control the motor speed, resistance means connected in the dynamic braking circuit for controlling the motor current during dynamic braking, a plurality of resistor-shunting switches operable in sequential relation either progressively or retrogressively to vary the resistance in the dynamic braking circuit, and a plurality of relays responsive to the motor current for jointly controlling the operation of said resistor-shunting switches to maintain a predetermined current in the motor circuit during dynamic braking.

10. In a control system, in combination, a motor, means for establishing a dynamic braking circuit for the motor to control the motor speed, resistance means connected in the dynamic braking circuit for controlling the motor current during dynamic braking, a plurality of resistor-shunting switches operable in sequential relation either progressively or retrogressively to vary the resistance in the dynamic braking circuit, and a pair of relays responsive to the motor current for controlling the operation of said resistor-shunting switches, one of said relays controlling the progressive operation of the switches and the other of said relays controlling the retrogressive operation to maintain a predetermined current on the motor circuit during dynamic braking.

GEORGE R. PURIFOY.